United States Patent
Lafreniere et al.

(10) Patent No.: US 8,869,226 B2
(45) Date of Patent: Oct. 21, 2014

(54) SYSTEM AND METHOD FOR VISUAL VOICEMAIL UTILIZING A SET-TOP BOX

(75) Inventors: Gary W. Lafreniere, Olathe, KS (US); David Emerson, Overland Park, KS (US); David Rondeau, Olathe, KS (US); Michael S. Goergen, Bend, OR (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1054 days.

(21) Appl. No.: 12/371,311

(22) Filed: Feb. 13, 2009

(65) Prior Publication Data

US 2009/0207984 A1   Aug. 20, 2009

Related U.S. Application Data

(60) Provisional application No. 61/066,059, filed on Feb. 15, 2008.

(51) Int. Cl.
| | |
|---|---|
| H04N 7/173 | (2011.01) |
| H04M 1/65 | (2006.01) |
| H04N 21/436 | (2011.01) |
| H04M 1/658 | (2006.01) |
| H04N 21/41 | (2011.01) |
| H04N 21/488 | (2011.01) |
| H04N 21/4788 | (2011.01) |
| H04M 3/533 | (2006.01) |

(52) U.S. Cl.
CPC ...... *H04M 1/6505* (2013.01); *H04M 2203/253* (2013.01); *H04M 2201/42* (2013.01); *H04M 3/53358* (2013.01); *H04N 21/43615* (2013.01); *H04M 1/658* (2013.01); *H04N 21/4131* (2013.01); *H04N 7/173* (2013.01); *H04N 21/4882* (2013.01); *H04N 21/4788* (2013.01)
USPC ............................ 725/133; 725/106; 725/153

(58) Field of Classification Search
CPC .. H04N 21/41; H04N 21/4104; H04N 21/478
USPC .................... 725/106, 133, 141, 153
See application file for complete search history.

(56) References Cited

U.S. PATENT DOCUMENTS

| | | | |
|---|---|---|---|
| 6,263,064 B1 | 7/2001 | O'Neal et al. | |
| 7,571,458 B1 * | 8/2009 | Eyal | 725/137 |
| 2005/0097622 A1 * | 5/2005 | Zigmond et al. | 725/135 |
| 2006/0020993 A1 * | 1/2006 | Hannum et al. | 725/111 |
| 2009/0143052 A1 | 6/2009 | Bates et al. | |
| 2009/0210917 A1 | 8/2009 | Lafreniere et al. | |

OTHER PUBLICATIONS

U.S. Appl. No. 12/371,377 Notice of Publication dated Aug. 20, 2009; 1 page.

(Continued)

*Primary Examiner* — Nicholas Corbo
(74) *Attorney, Agent, or Firm* — Swanson & Bratschun, L.L.C.

(57) ABSTRACT

A system and method for managing voicemail locally through a set-top box. A call is received from a caller. The call is intercepted utilizing a set-top box. An indicator is displayed to a television in communication with the set-top box. The indicator being indicative of the message being recorded. One or more messages are visually represented to a user in response to the user selecting a channel of the set-top box, the channel being associated with voicemail. The one or more messages are managed in response to user input received through a re remote control in communication with the set-top box.

20 Claims, 6 Drawing Sheets

(56) References Cited

OTHER PUBLICATIONS

U.S. Appl. No. 12/371,377 NonFinal Office Action dated Jun. 8, 2011; 12 pages.
U.S. Appl. No. 12/371,377 Final Office Action dated Nov. 18, 2011; 14 pages.
U.S. Appl. No. 12/371,377 NonFinal Office Action dated Aug. 8, 2013; 14 pages.
U.S. Appl. No. 12/371,377 Notice of Allowance dated Mar. 3, 2014; 7 pages.

* cited by examiner

US 8,869,226 B2

SYSTEM AND METHOD FOR VISUAL VOICEMAIL UTILIZING A SET-TOP BOX

PRIORITY

This application claims priority to provisional application Ser. No. 61/066,059, filed on Feb. 16, 2008 which is incorporated herein by reference.

BACKGROUND

The use of and development of communications has grown nearly exponentially in recent years. The growth is fueled by larger networks with more reliable protocols and better communications hardware available to service providers and consumers. Many communications and entertainment systems are growing together as people expect services that are more intuitive and integrated with their day-to-day life. Some systems, devices, features, and services have not kept pace with the growth experienced by sections of the communications industry. In particular, answering machines and voicemail systems are mostly still limited to legacy systems and applications.

SUMMARY

One embodiment provides a system and method for managing voicemail locally through a set-top box. A call may be received from a caller. The call may be intercepted utilizing a set-top box. An indicator may be displayed to a television in communication with the set-top box. The indicator may be indicative of the message being recorded. One or more messages may be visually represented to a user in response to the user selecting a channel of the set-top box, the channel being associated with voicemail. The one or more messages may be managed in response to user input received through a re remote control in communication with the set-top box.

Another embodiment provides a set-top box for taking messages. The set-top box may include a telephonic answering module operable to monitors a voice communications line. The telephonic answering module may be operable to intercept a call from a caller. The telephonic answering module may be further operable to record a message in response to intercepting the call. The set-top box may also include a memory in communication with the telephonic answering module. The memory may be operable to store the message. The set-top box may also include an interface in communication with the telephonic answering module. The interface may be operable to display a user interface on a television. The user interface may be operable to manage a plurality of messages.

Yet another embodiment provides a set-top box. The set-top box may include a processor for executing a set of instructions and a memory in communication with the processor. The memory may be operable to execute a set of instructions. The set of instructions may be executed to receive a call from a caller, intercept the call utilizing a set-top box, store a message from the caller in the set-top box, display an indicator to a television in communication with the set-top box the indicator indicative of the message being recorded, visually represent one or messages to a user in response to the user selecting a channel of the set-top box the channel being associated with voicemail, and manage the one or more messages in response to user input the user input being received through a remote control in communication with the set-top box.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

The illustrative embodiments provide a system and method for implementing communications features utilizing a set-top box. In one embodiment, the set-top box may perform voice messaging. In one embodiment, the voicemail messages are visual voicemail messages that are accessed, controlled, and managed utilizing the set-top box. The set-top box may allow a user to initiate calls, screen calls, record calls and messages, and otherwise perform other communications features.

Figure 1:
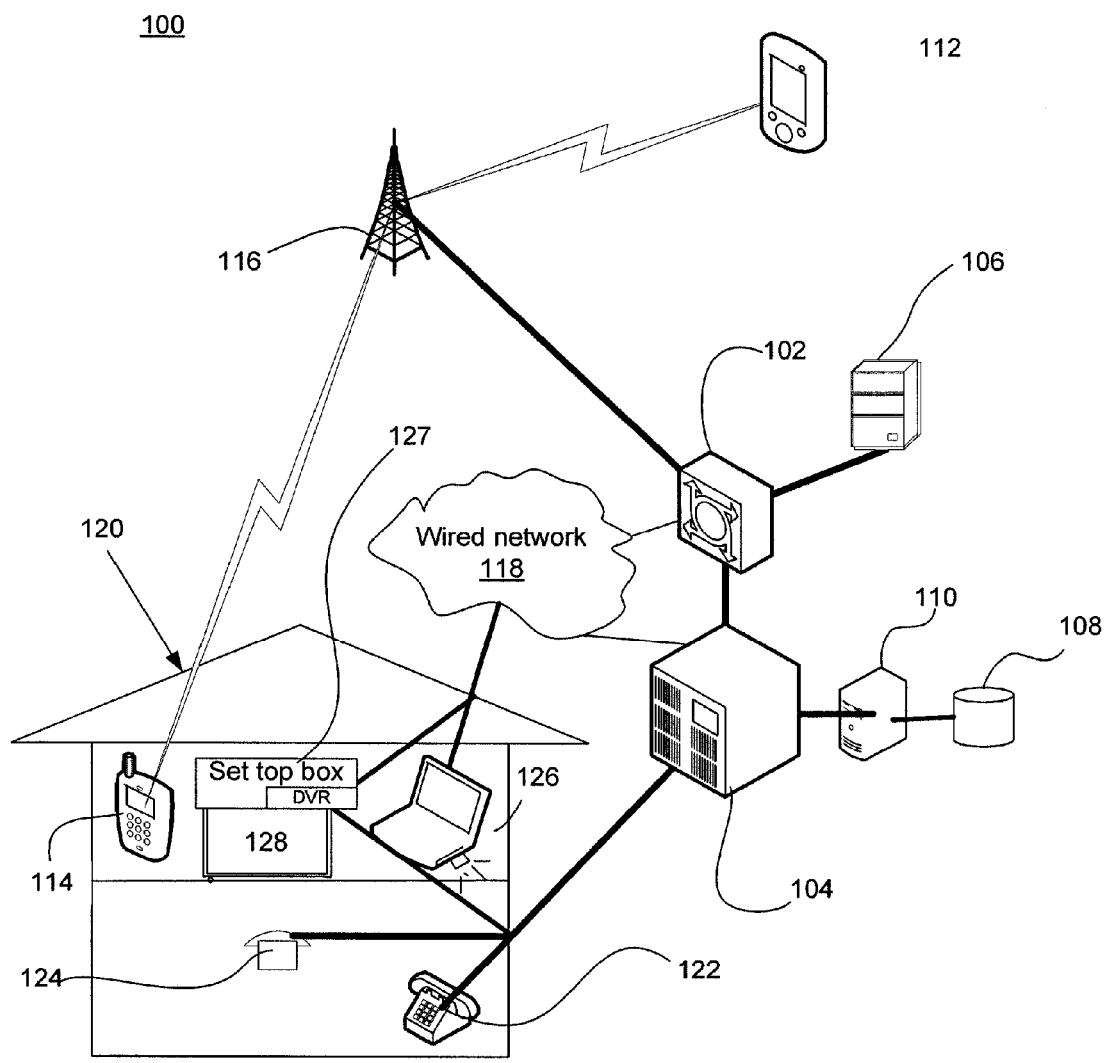
FIG. 1 is a pictorial representation of a communications system in accordance with an illustrative embodiment.

FIG. 1 is a pictorial representation of a communications system 100 in accordance with an illustrative embodiment. The communication system 100 of FIG. 1 includes various elements used for wireless and wired communication. The communications system 100 includes a mobile switching center (MSC) 102, a local exchange 104, voicemail systems 106 and 108, a database 110, wireless devices 112 and 114, a transmission tower 116, a communications network 118, a home 120, home telephones 122 and 124, a client 126, a set-top box 127, and a television 128. The different elements and components of the communications system 100 may communicate using wireless communications including satellite connections and/or hardwired connections, such as fiber optics, T1, cable, DSL, high speed trunks, and telephone lines.

The wireless devices 112 and 114 may communicate with the transmission tower 116 using communications protocols, such as time division multiple access (FDMA), code division multiple access (CDMA), global systems for mobile (GSM) communications, personal communications systems (PCS), WLAN, WIMAX, or other frequently used cellular and data communications protocols and standards. The wireless devices 112 and 114 may include cellular phones, Blackberry®, personal digital assistances (PDA), mp3 players, laptops, evolution data optimized (EDO) cards, multi-mode devices, and other wireless communication devices and elements.

Communications within the communications system 100 may occur on any number of networks which may include wireless networks, data or packet networks, cable networks, satellite networks, private networks, publicly switched telephone networks (PSTN), and the communications network 118. The networks of the communications system 100 may represent a single communication service provider or multiple communications services providers. The features of the embodiments may be implemented by one or more elements of the communications system 100 independently or as a networked implementation.

In one embodiment, the MSC 102, voicemail system 106, and transmission tower 116 are part of a wireless network that is operated by a wireless service provider. For example, the control signals and operational features may be performed by the MSC 102 and the wireless signals may be broadcast from the transmission tower 116 to the wireless devices 112 and 114. The wireless network may include any number of systems, towers, servers, and other network and communications devices for implementing the features and performing the methods herein described. The wireless network may enable cellular, data, radio, television service, or other wireless schemes. For example, the transmission tower 116 may transmit signals to cell phones, Blackberry devices, car radios, and high definition televisions.

The MSC 102 may be a switch used for wireless call control and processing. The MSC 102 may also serve as a point of access to the local exchange 104. The MSC 102 is a telephone exchange that provides circuit switched calling and mobility management and may also provide GSM or PCS services to the wireless devices 112 and 114 located within the area the MSC 102 serves. The MSC 102 may include a home location register (HLR) and visitor location register (VLR) that may be used to implement different features of the illustrative embodiments. The voicemail system 106 may be an integrated part of the MSC 102 or alternatively may be an externally connected device.

In one embodiment, the voicemail system 106 may include an integrated database for storing customer and usage information and data. In another embodiment, the voicemail system 106, a server, or other intelligent network device may store user preferences for retrieving and displaying information to the television 128 through the set-top box 127, as further described herein. The television is one embodiment of a display. The display is a device for displaying visual or tactile information. The display may also be a computer monitor, projector, braille pad, or other similar device, system or equipment suitable for displaying content. The user may communicate, interact, or send and receive data, information, and commands to the voicemail system 106 through the telephones 122 and 124, wireless device 112 and 114, or the client 126. The MSC 102 and voicemail system 106 may include any number of hardware and software components.

The local exchange 104, the MSC 102, and/or other elements of the communications system 100 may communicate using a signal control protocol, such as a signaling system number 7 (SS7) protocol. The SS7 protocol or similar protocols are used in publicly switched networks for establishing connections between switches, performing out-of-band signaling in support of the call-establishment, billing, routing, and implementing information-exchange functions of a publicly switched network or the communications network 118. The local exchange 104 may be owned and operated by a local exchange carrier that provides standard telephone service to any number of users. In one embodiment, the local exchange 104 may be a class 5 switch that is part of the network systems of the local carrier. The local exchange 104 may include or may be connected to the voicemail system 106. However, the local exchange 104 may also be a Digital Subscriber Line Access Multiplexer (DSLAM), Internet Protocol (IP) gateway, base station, or any other suitable network access point.

The local exchange 104 may be a wire-line switch or public exchange using time domain multiplexing to provide telecommunications services to a particular subscriber or groups of subscribers. The local exchange 104 may be located at a local telephone company's central office, or at a business location serving as a private branch exchange. The local exchange 104 may provide dial-tone, calling features, and additional digital and data services to subscribers, such as home phones 122 and 124. The local exchange 104 may also enable voice over Internet protocol (VoIP) communication of the home telephones 122 and 124 through a data network. VoIP works by sending voice information in digital form, such as packets, rather than using the traditional circuit-committed protocols of the publicly switched network. The local exchange 104 may be or include a feature server, a call control agent, or an IP gateway for implementing VoIP communications.

The communications system 100 may further include any number of hardware and software elements that may not be shown in the example of FIG. 1. For example, in order to facilitate VoIP communications, the communications system and the MSC 102 and local exchange 104 in particular, may include additional application servers, media servers, service brokers, call agents, edge routers, gateways (signaling, trunking, access, sub, etc.), IP network service providers, adapters, exchanges, switches, users, and networks. The voicemail system 108 is similar to the voicemail system 106 except that it is equipped to handle voicemail for landline customers rather than wireless customers. One embodiment, of the voicemail systems 106 and 108 are further described in FIG. 4. The local exchange 104 or other components of a wire line network, such as a data, PSTN, VoIP, or other wired network may communicate with the set-top box 127, television 128, or other elements of the home 120 to implement the features and perform the methods herein described.

The MSC 102 and the local exchange 104 may include an authentication space. The authentication space may be a partition, module, or other storage or memory of the server designated by the communications service provider. The authentication space may validate that a user or device, such as client 126, is allowed to authorize the MSC 102, local exchange 104, or corresponding voicemail systems 106 and 108 to set preferences, implement changes, review information, or perform other updates. For example, a user may be first required to provide a secure identifier, such as a user name, password, or other authentication code or hardware interface, to verify the user is authorized to make changes within the authentication space.

The authentication information may be used to create a secure connection between the client 126 or television 128 and the MSC 102 or the local exchange 104. The secure connection may be a virtual private network tunnel, an encrypted connection, firewall, or other form of secured communications link. The MSC 102 and local exchange 104 may use any number of gateways, proxies, applications, or interfaces for allowing the client 126 and television 128 to communicate with the MSC 102 and local exchange 104 through the communications network 118. Alternatively, the client 126 may use a wireless network or other network to access the MSC 102 and local exchange 104. The MSC 102 and local exchange 104 may use a host client application for communicating with numerous clients.

The home 120 is an example of a dwelling, residence, or location of a person or group that may utilize any number of communications services. The home 120 is shown as a residence in the illustrated example, however, the home 120 may also be an office, business, or other structure wired or otherwise suitably equipped to provide telephone, data, and other communication services to one or more customers. In one embodiment, the home 120 is equipped with multiple communication devices, including home telephones 122 and 124 and client 126. The home telephones 122 and 124 may be standard devices that provide dialing and voice conversation capabilities. Home telephone 122 may be integrated in any number of other devices or may be used in different forms. For example, the home telephone 122 may be part of a refrigerator or intercom system. In another embodiment, the home telephone 124 may be integrated with a personal computer, such as client 126.

The communications services accessible from the home telephones 122 and 124 may include standard telephone service or VoIP telephone service. The home telephones 122 and 124 may be VoIP telephones or may be standard telephones that include a modem and/or VoIP adapters for enabling VoIP communications.

The television 128 may be any number of display devices for displaying analog or digital content in any available standard or high definition formats. As shown, the television 128 may be integrated with or incorporate the set-top box 127 or may be networked to the set-top box 127, as further shown in FIG. 2. The set-top box 127 is a device for receiving, converting, formatting, and sending the picture and sound of the broadcast to the associated display. The broadcast may be communicated by the set-top box 127 utilizing any number of connection types, signals, and formats, such as HDMI, coaxial, digital, RCA connectors, analog, compressed, WiFi, and so forth. In one embodiment, the set-top box 127 may be a media receiver, digital or personal video recorder, a gaming device (i.e., devices manufactured by Nintendo®, Microsoft®, and Sony®). Content may be streamed to the television 128 through the communications network 118 or through the connection with the local exchange 104. In other words, the television 128 may receive and process content from a plain old telephone service (POTS) line, cable, satellite, fiber optic, DSL, Internet Protocol television, or other communications medium. A special tone, message, alert, or other feedback may specify once or repeatedly that the visual voicemail is available through the television. For example, the television 128 may sound a double chirp when a new message has been received by the voicemail system 108 for playback through the television 128. In another embodiment, messages received by either of the voicemail systems 106 and 108 may be configured for playback through the television 128.

The client 126 may be a personal computer for performing and executing programs and instructions and accessing the communications network 118. However, the client 126 may be any computing devices suitable for communicating with the communications network 118 through a network connection. The communications network 118 may be a fiber optic, cable, or telephone network or other wired network suitable for communication over a hard wired connection with the client 126. In one embodiment, the home 120 may include a wireless router, adapter, switch, hub, or other suitable interface that allows the client 126 to communicate with the communications network 118. Alternatively, the client 126 may communicate with the communications network 118 through a wireless connection. The MSC 102 and local exchange 104 may use a graphical user interface (GUI), such as website, portal, or program accessible from the client 126 in order to enter and receive input preferences for the voicemail servers 106 and 108.

In an illustrative embodiment, the user may provide user input, settings, or configurations or otherwise make selections and communicate commands using devices, such as or similar to, the set-top box 127, wireless devices 112 and 114, home telephones 122 and 124, and client 126. At any time, a user may select to enable, order, initiate, configure, reconfigure, or otherwise determine how the voicemail systems 106 or 108 are accessed and utilized through the television 128.

At any time, a user may select to enable, order, initiate, implement, or otherwise request the features herein described. For example, the user may use a command that informs a function trigger of a device or the device itself, such as the MSC 102, local exchange 104, voicemail systems 106 and 108, wireless device 112 and 114, home telephones 122 and 124, a remote control, or client 126, to enable visual voicemail messages to be transparently displayed on the television 128 simultaneous with other content. In one example, the user may submit a command to activate the voicemail system for television interaction by entering *22 on a remote control for the television 128 and then enter a pass code, account code, password, pin number, or other identifier. The command may also be a password, voice activated, time activated, preset by user selection or any other suitable option, setting, command, or user input. In another embodiment, the various features may be implemented through the remote control using tactile commands.

Figure 2:
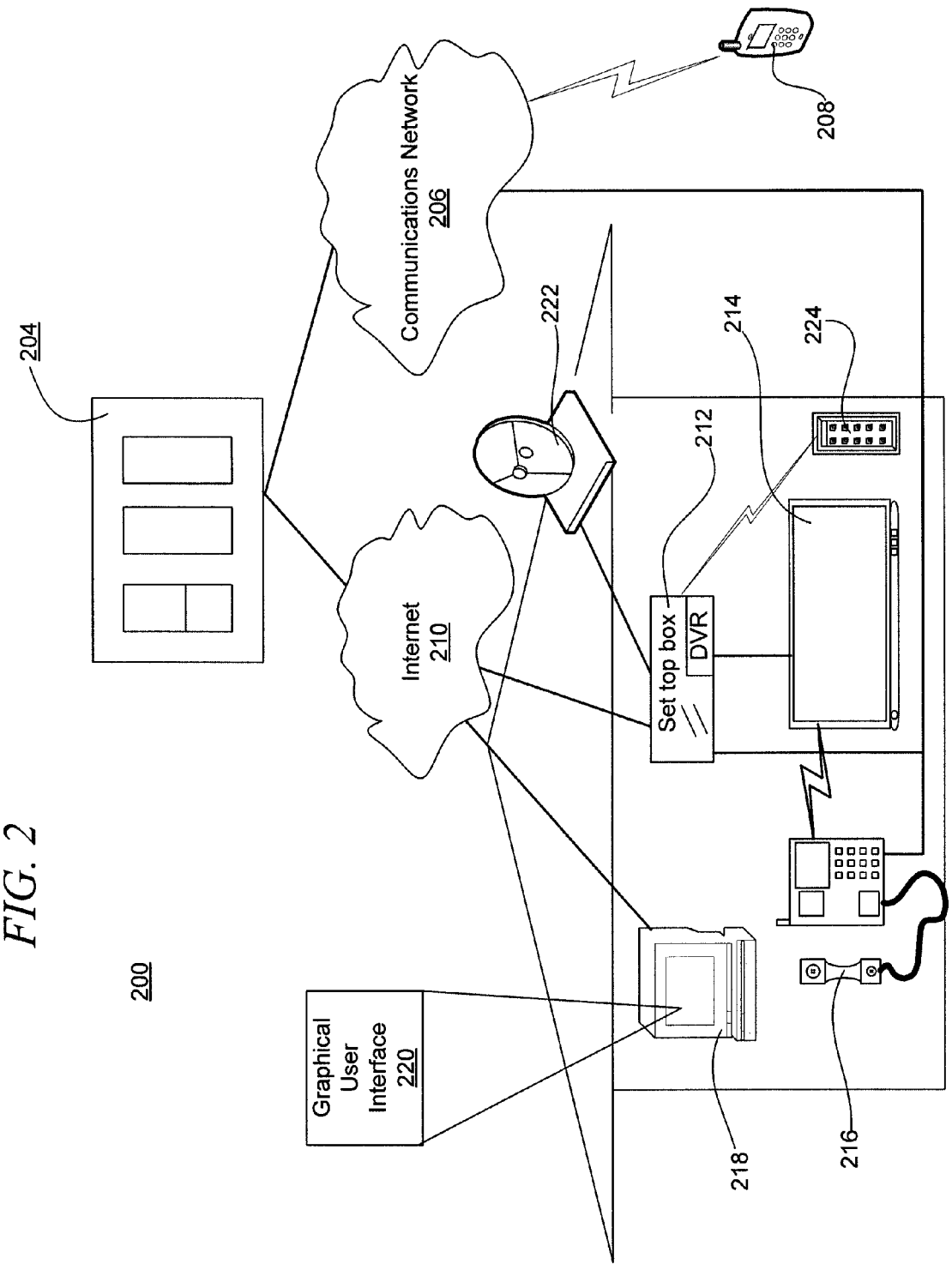
FIG. 2 is a pictorial representation of a communications system in accordance with an illustrative embodiment.

FIG. 2 is a pictorial representation of a communications system 200 in accordance with an illustrative embodiment. The communication system 200 of FIG. 2 is a particular implementation of portions of the communications system 100 of FIG. 1. In one embodiment, the communication system 200 may include a communications management system 204, a communications network 206, a wireless device 208, the Internet 210, a set-top box 212, a television 214, a phone 216, a client device 218 including a graphical user interface 220, a satellite 222, and a remote control 224.

In one embodiment, the set-top box 212 may be connected to a voice communications line only through the communications network 206. The voice communications line may be a POTS or VoIP line. The set-top box 212 may be directly connected to the voice communications line or may indirectly be connected through a wireless connection with the phone 216. As a result, the set-top box 212 acts as a locally accessible and managed device. In another embodiment, the set-top box 212 may be networked to communicate with the communications network 206 and the Internet 210.

The communications management system 204 is one, or more devices utilized to enable, initiate, route, and manage communications between one, or more telephonic devices. The communications management system 204 may include one, or more devices or systems networked to manage or control all or portions of the communications network 206 and Internet 210. For example, the communications management system 204 may include any number of servers, routers, switches, or advanced intelligent devices. The communications network 206 sends and receives the electronic signals through any number of transmission mediums. In one embodiment, the communications management system 204 and the communications network 206 or Internet 210 may implement VoIP or POTS communications. The Internet 210 may also be any number of networks suitable for packet communications.

In one embodiment, the communications management system 204 may house a voicemail server or system utilized to manage visual voicemail. The devices within the home, business or organization may be connected to any number of hardwired or wireless network connections as illustrated. In one embodiment, the television 214 and set-top box 212, home telephone 216, and client device 218 may communicate with one another through an internal wired or wireless network, such as WiFi, Ethernet, or powerline communications. Similarly, each of the aforementioned devices may communicate with external devices, systems, and users through the Internet 210 or through the communications network 206. The communications network 206 may be a POTS line, a VoIP line or other form of network connection or communications line.

The communications management system 204 and voicemail server may include a portal, web page, or other access point for interfacing with a user or a device. For example, the portal may be accessed through the Internet 210 by the set-top box 212 in order to determine whether any new messages have been recorded by the voicemail server. The portal or the server may be accessed using any number of devices, such as the wireless device 208, the client device 218, or the set-top box 212 in order to specify the preferences for displaying the visual voicemail through the television 214.

The graphical user interface 220 is an interface for allowing the user to interact with the devices and elements of the communication system 200. In one embodiment, the graphical user interface 220 is a visual voicemail application utilized by the set-top box 212 for displaying data, information, images, and other content to the user and receiving user input and feedback. For example, utilizing the graphical user interface 220 displayed to any of the aforementioned devices, the user may be able to specify how and when incoming calls, messages and voicemail accounts are displayed on the television 214. The user may also specify how the voicemail may be managed through the remote control 224 or through the other communications devices as shown in FIG. 2.

In another embodiment, the communications management system 204 may communicate with a number of voicemail servers. The voicemail servers may be represented by a single communications service provider or multiple communications service providers. The set-top box 212 or portal may store access information that allows the set-top box 212 or communications management system 204 to access and manage the various voicemail servers or voicemail accounts. The access information may include an access number, account number, password, pin number, phone number or other information, data, or identifiers that may be required to access the various voicemail servers. As a result, the set-top box 212 may allow a user to access and manage a number of voicemail accounts simultaneously.

In one embodiment, an interface of the set-top box 212 may allow messages to be transferred between separate accounts. Commands that are given by the user visually utilizing the television 214 and remote control 224 may be converted to key sequences, verbal commands, or other command formats that may be implemented by each of the voicemail servers or systems. As a result, the user may manage a number of voicemail accounts simultaneously through the set-top box 212.

The set-top box 212 controls the audio and video content displayed or played by the television 214. In one embodiment, the satellite 222 may receive content that the set-top box 212 formats, decrypts or otherwise, processes for display on the television 214. The set-top box 212 may also receive content through the Internet 210 or through the communications network 206. In one embodiment, an incoming call may be received by a user on the home telephone 216. The call may be received through the communications network 206. As the call is being received, the set-top box 212 may display caller identification information allow the user to screen the calls on the television 214 before deciding to answer the call or send it to visual voicemail. For example, the user may provide commands, user input or feedback through the remote control 224 that is sent through the set-top box 212 to the voicemail system of the communications management system 204. Similarly, the set-top box 212 may record a conversation based on user input through the remote control 224. In one embodiment, the remote control 224 may be configured to receive voice commands and tactile input.

In one embodiment, the communications management system 204 may utilize the portal to retrieve caller information. The caller information may include a profile, contact, or information that is stored in one or more address books. In one embodiment, the portal may compile caller information in a global directory for all contacts included in email, voicemail, social, networking, chat, and other accounts to display the caller information. For example, a picture associated with a user may be retrieved and displayed from a chat account, as well as an email address from an email account.

The user may specify that all incoming calls for a period are to be recorded to the set-top box 212 or the visual voicemail accessible through the voicemail server rather than ringing the home telephone or displaying a call alert on the television 214. The set-top box 212 may format information, data, packets, or other communications from the voicemail system that are received for displaying the voicemail system on the television 214. The set-top box 212 may display the name of the caller, the time the call was received, the length of the recorded message and any other information specified by the user or otherwise logged or recorded by the voicemail system. In another embodiment, the set-top box 212 may log and store the information using a memory or designated portion of the digital video recorder for later retrieval and access by the user.

The user may select to listen to voicemail messages by providing user input through the remote control 224 or directly through the television 214 or set-top box 212. The messages may be played through the audio and/or visual systems of the television 214. For example, a message from the user's mother may be played through the television 214. Alternatively, the television 214 may be connected to any number of audio or visual systems for further enhancing playback of any messages recorded by the voicemail system. As a result, a user is more easily able to process voicemail messages using the remote control 224, television 214, and set-top box 212, rather than using a traditional answering machine or voicemail system.

In addition, the portal may allow one or more users access to the voicemail systems from any number of locations through the Internet 210 or through the communications network 206. The voicemail systems and set-top box 212 may use any number of interfaces to allow the user to navigate or interact with the voicemail system. In one embodiment, the interface may display a new message indicator any time a customer has an unplayed message in the inbox of the voicemail system. For example, an indicator may be a semi-translucent telephone shown in a corner of the television 214. The indicator may be played to the user during regularly viewed content or during playback of video, DVD, or other stored audio or video content.

The interface may require that a user provide a password or other pass code in order to access one or more accounts of the voicemail system. In addition, the interface to the voicemail system, which may be the graphical user interface 220, may allow the user to select an avatar picture or other information associated with any number of callers, phone numbers, devices, IP addresses, account names, or other calling information. The user may utilize the graphical user interface 220 displayed on the television 214 to easily determine which messages to review or playback from the voicemail system and in which order determined by the user. The set-top box 212 may be a digital video recorder, satellite 222 transceiver, cable box or other device utilized for processing signals for display by the television 214. The set-top box 212 may similarly allow control of the playback. For example, the set-top box 212 may allow a message to be rewound, slowed, fast forwarded, changed to a different pitch, enhanced, filtered, or otherwise controlled.

In another embodiment, the set-top box 212 may act as the local voicemail system. In other words, any incoming calls received through the Internet 210 or through the communications network 206 may be intercepted and recorded by the set-top box 212. The user may then manage the voicemail messages visually utilizing the remote control 224 on the television 214. The integration of the set-top box 212 as a voicemail system may allow a user to more efficiently manage messages, screen calls and otherwise receive communications based on the ease of use of the television 214 and remote control 224. In addition, the portal of the communications management system 204 may be utilized to communicate with the set-top box 212 through a communications link or network connection. The user may remote retrieve messages using an interactive voice response system of the portal or a web interface in order to listen to, view, or otherwise manage messages.

Figure 3:
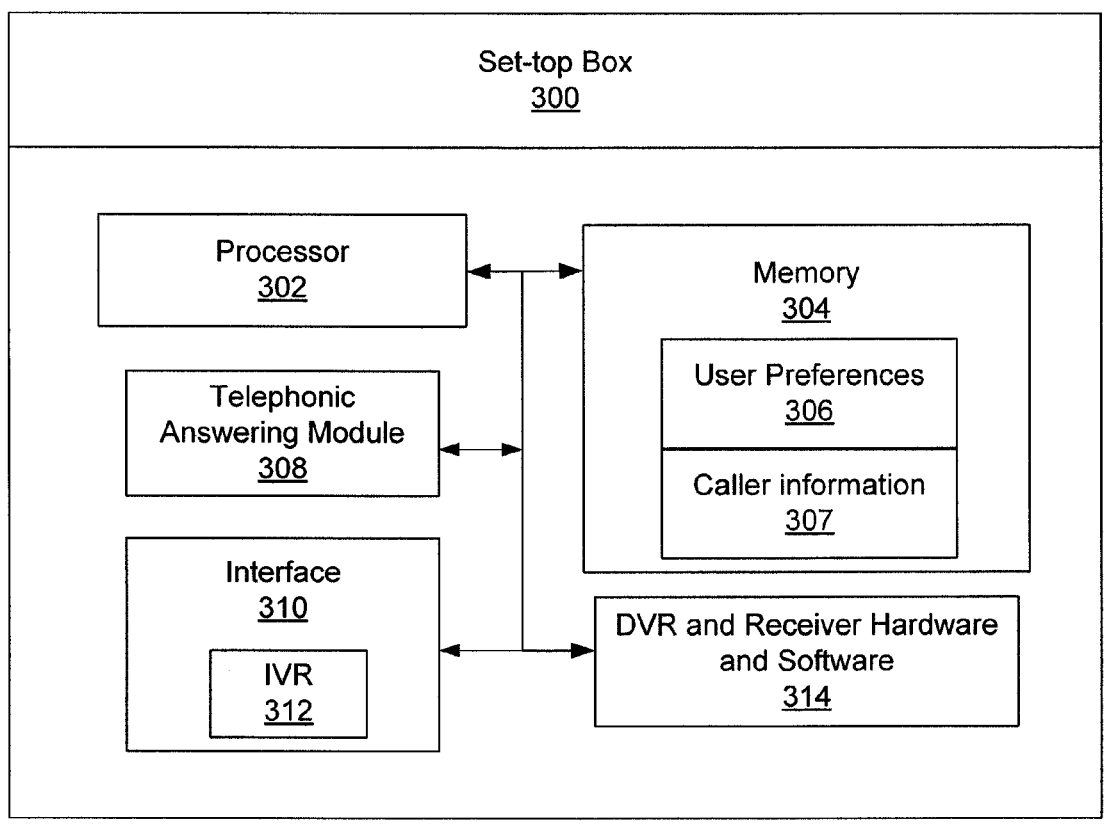
FIG. 3 is a block diagram of a set-top box in accordance with an illustrative embodiment.

FIG. 3 is a block diagram of a set-top box 300 in accordance with an illustrative embodiment. The set-top box 300 is a particular implementation of the set-top box of FIG. 2. In one embodiment, the set-top box 300 may include a processor 302, a memory 304, user preferences 306, caller information 307, a telephonic answering module 308, an interface 310, an interactive voice response (IVR) system 312, and DVR and receiver hardware and software 314.

The processor 302 is circuitry or logic enabled to control execution of a set of instructions. The processor 302 may be a microprocessor, digital signal processor, central processing unit, or other device suitable for controlling an electronic device including one or more hardware and software elements, executing software, instructions, programs, and applications, converting and processing signals and information, and performing other related tasks. The processor 302 may be a single chip or integrated with other computing or communications elements.

The memory 304 is a hardware element, device, or recording media configured to store data for subsequent retrieval or access at a later time. The memory 304 may be static or dynamic memory 304. The memory 304 may include a hard disk, random access memory, cache, removable media drive, mass storage, or configuration suitable as storage for data, instructions, and information. In one embodiment, the memory 304 and processor 302 may be integrated. The memory 304 may use any type of volatile or non-volatile storage techniques and mediums.

The memory 304 may store messages recorded on the set-top box or digital video recorder (DVR). In one embodiment, the memory 304 is integrated with the DVR and receiver hardware and software 314. In one embodiment, the memory 304 may be partitioned for utilization by the DVR and receiver hardware and software 314 as well as the telephonic answering module 308.

The user preferences 306 are settings, criteria, and parameters controlling the communications features of the set-top box 300. For example, the user preferences 306 may specify that a picture-in-picture window is utilized to display caller identification (ID) when a call is incoming to a home phone and the set-top box 300. The user preferences 306 may also specify the format of the display utilized by the interface 310 to receive user input.

The caller information 307 is information about one or more contacts. In one embodiment, the caller information 307 may be a global or local address book. For example, the caller information 307 may be updated by the user for use by the set-top box 300, only. In another example, the caller information 307 may be configured to retrieve contacts, communications information, profiles, and other information through a network connection. The information may be retrieved from online accounts, external devices, or other systems, equipment, or services managed, controlled or accessible by the user.

The telephonic answering module 308 is a module configured to interface with the communications line utilized by a home telephone or other telephonic device. In one embodiment, the telephonic answering module 308 or telephone answering device (TAD) may be configured to take a call off-hook for answering a call, playing a recording, or otherwise recording a message to the memory 304. In one embodiment, the set-top box 300 acts as the voicemail system for storing and allowing a user to navigate messages utilizing the television and remote control. The telephonic answering module 308 may also be an application or logic for managing messages, folders, accounts, as well as the user preferences 306 and caller information. In one embodiment, the telephonic answering module 308 may convert all or portions of messages received into text for display. As a result, the user may more easily manage messages.

In another embodiment, the set-top box 300 acts as an interface for allowing a user to access a remote server or other voicemail system in order to retrieve and display messages. The telephonic answering module 308 allows the set-top box 300 to pick up incoming calls in order to play a message prompt, provide a caller messaging options, and record messages.

The interface 310 is a user interface for accessing messages stored locally on the set-top box 300 or for accessing a portal or server in which the message may be stored. In the first embodiment, the interface 310 may display a graphical user interface to a user that allows a user to visually or tactilely manage messages. For example, the interface 310 may be accessible through a remote control allowing a user to specify a playback order for any number of new messages. In addition, the interface 310 may allow a user to set preferences for playing and recording messages, such as the message prompt, the time recording system, the amount of time allotted for recording a message and other similar settings.

The interface 310 may also allow a user to specify the user preferences 306 and retrieve the caller information 307 which may be stored in the memory 304. For example, the interface 310 may receive user feedback that indicates how the set-to box displays a message indicator to the television. For example, the user may specify through the interface 310 that any new messages are to be displayed on the television using a similar translucent icon of the user's selection. In another embodiment, the interface 310 communicates directly with a portal or server in order to retrieve messages from a separate communications management system or playback through the set-top box. The interface 310 may format the messages received from the portal or server for coherent playback to the user. Similarly, the interface 310 may allow the user to manage the voicemail system remotely from the set-top box.

In one embodiment, the interface 310 includes the IVR 312. The WVR is an interface for managing the set-top box utilizing voice input. In particular, the IVR may be accessed by dialing the phone number or IP address of the interconnected phone. For example, the IVR may play voice prompts or a menu to receive voice commands to retrieve and manage messages and accounts available through the set-top box 300.

The digital video recorder and receiver hardware and software 314 are the hardware and software elements that allow the set-top box to function as a DVR and as a receiver. In one embodiment, the DVR and receiver hardware and software 314 may include logical elements for converting signals into content that may be displayed to the television or other display. For example, the DVR and receiver hardware and software 314 may format the satellite signals for display to the user and similarly, may function to display a message icon at the same time the standard content is displayed to the user.

Figure 4:
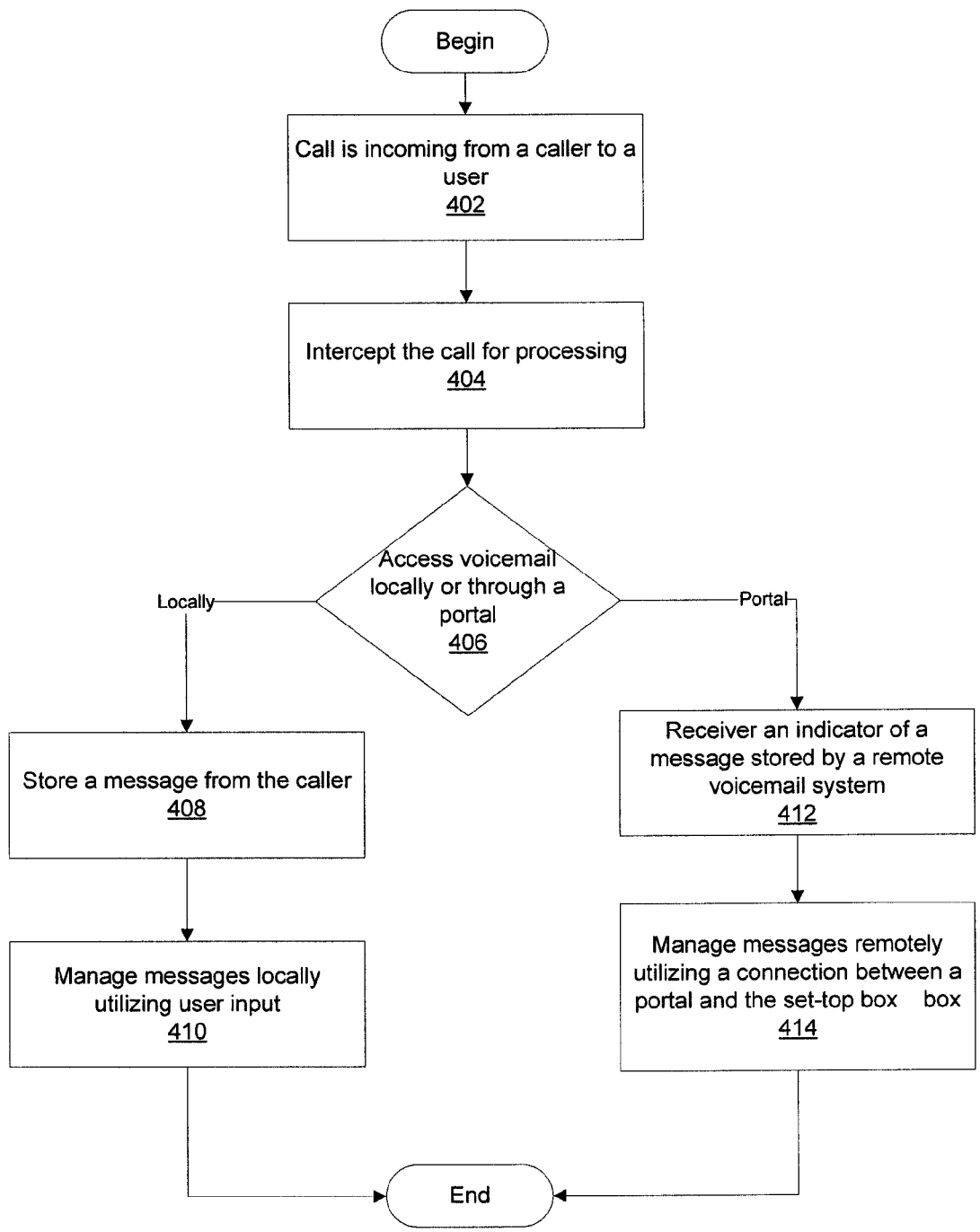
FIG. 4 is a flowchart of process for processing voicemail in accordance with an illustrative embodiment.

FIG. 4 is a flowchart for processing voicemail in accordance with an illustrative embodiment. The process of FIG. 4 may be implemented by a set-top box. The process begins as a call is incoming from a caller to the user (step 402). For example, the caller may have called the user to carry on a personal or business conversation.

Next, the set-top box intercepts the call for processing (step 404). During this step, the set-top box may play a message prompt and record a message. In another embodiment, the set-top box may send a signal to a server, portal, or other voicemail system so that the voicemail system may record a message or otherwise process a call. A remote voicemail system may also be configured to automatically record the message. The call may be intercepted automatically based on a specified criteria or parameters or based on a user selection. For example, the user may specify that if the phone rings more than three times without being answered, the set-top box prompts a caller to record a message. Similarly, the set-top box may record a message if a do-not-disturb feature has been activated, the user is watching a television program, or based on an alternative criteria specified by the user in user preferences. In another embodiment, caller ID information may be displayed to the user in response to receiving a call. User input based on the information displayed to the user may allow the message to be immediately recorded by the set-top box, or sent to a remote voicemail system to be received and processed.

Next, the set-top box determines whether to access voicemail locally or through a portal (step 406). The determination of step 406 may be made based on the configuration or capabilities of the set-top box. In one embodiment, the set-top box may only be connected to a communications line for receiving communications, such as a POTS or VoIP line. As a result, the voicemail system may be integrated with the set-top box and the corresponding TAD. In another embodiment, the set-top box may utilize a network connection to communicate with a voicemail system of an external server or web portal managed by a communications service provider.

As described, the determination whether to access the voicemail locally or through portal may be based on user feedback and through the configuration utilized by the set-top box. If the determination is to access the voicemail locally, the set-top box stores a message from the caller (step 408). In one embodiment, the message may be stored in a partition of the DVR dedicated to voicemail messages and applications.

Next, the set-top box manages messages locally utilizing user input (step 410). The voicemail may be managed by a user utilizing a remote control, a television and/or the set-top box. For example, the voicemail system may be managed based on user feedback indicating whether to play messages, delete messages, save messages or otherwise configure voicemail folders, settings or other user preferences.

If the set-top box determines to access voicemail through a portal in step 406, the set-top box receives an indicator of a message stored by a remote voicemail system (step 412). The indicator may be an alert that is played immediately or in response to a determination that a user is accessing the set-top box or watching the connected display. Next, the set-top box manages messages remotely utilizing a connection between a portal and the set-top box (step 414). A graphical user interface or the portal itself may be displayed to the set-top box in order to graphically manage voicemail messages. In one embodiment, the portal may be a web interface to a voicemail system. In another embodiment, the portal may be an interface to a voicemail server or other intelligent network devices. For example, during step 414 a network connection may be utilized to set and receive commands so that the user may manage the voicemail through the set-top box.

Figure 5:
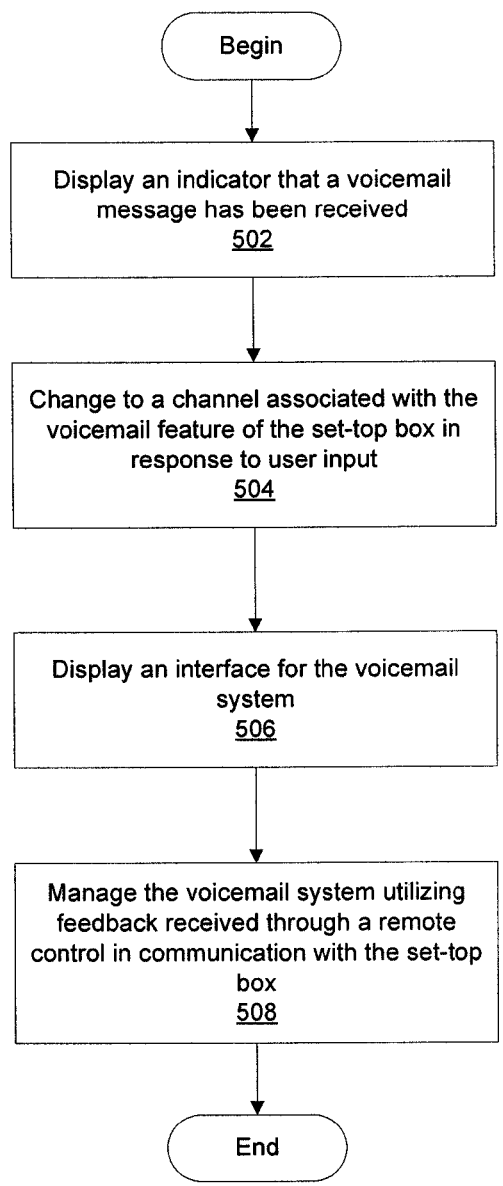
FIG. 5 is a flowchart of process for utilizing visual voicemail from a set-top box in accordance with an illustrative embodiment.

FIG. 5 is a flowchart of process for utilizing visual voicemail from a set-top box in accordance with an illustrative embodiment. The process of FIG. 5 may be implemented by a user accessing a remote control, television, the set-top box or an interface of a communications portal.

The process may begin with the set-top box displaying an indicator that a voicemail message has been received (step 502). In one embodiment, the indicator may be a translucent image of a message. In another embodiment, a picture-in-picture of a picture or avatar associated with the caller may be displayed to the television. In yet another embodiment, a remote control linked with the set-top box may vibrate or the set-top box, television, and remote control may play a specific audio alarm.

Next, the set-top box changes to a channel associated with the voicemail feature of the set-top box in response to user input (step 504). The set-top box may have a dedicated channel for displaying a graphical user interface, voicemail display, or portal to the user. The channel may be selected automatically based on the service provider or may be programmed by the user. In one embodiment, a button on the remote control may be dedicated to changing the set-top box to the designated channel.

Next, the set-top box displays an interface for the voicemail system (step 506). As previously described the voicemail system may be the components and modules of the set-top box or a remotely accessible voicemail system. The interface may allow a user to visually manage voicemail messages.

Next, the set-top box manages the voicemail system utilizing feedback received through a remote control in communication with the set-top box (step 508). The remote control may utilize infrared, Bluetooth®, WiFi, or other communications standards and protocols. The user may particularly save, delete, or transfer messages. In one embodiment, the set-top box may access multiple voicemail accounts. Messages may be transferred between the various accounts based on selections of the user. The appropriate commands or signals may be utilized by the set-top box or portal to manage the messages and accounts.

The following example gives additional details that may apply to the flowcharts of FIG. 4 *and* 5. The user may utilize a remote control to access the set-top box. The remote control may be a standard or other remote device suitable for communications with the set-top box. The set-top box graphical user interface displays a menu of options. The options may specify how the user is able to control the visual voicemail and other features linked with the visual voicemail.

Next, the customer selects voicemail systems using the remote control. The set-top box graphical user interface may display a message menu to the user on the television or through a portal. The customer selects an inbox using the remote control. The set-top box graphical user interface then displays the voicemail inbox to the user. The voicemail inbox may be displayed visually, graphically, textually, audibly or another format to the user. The customer may use the remote control to select a message. The customer may also use the remote control to select a messaging option, such as play, save, and delete from among any number of options. For example, if the user selects play, the set-top box graphical user interface plays selected messages through the television or television speakers. The message may be an audio, video or other form of message recorded to the set-top box or the external voicemail system. If the user selects save, the set-top box graphical user interface sends notification to the voicemail server to mark the message as played. For example, utilizing an Internet connection, a phone line or other communications link, the set-top box may send the message or command to the voicemail server. If the user selects to delete the message, the set-top box graphical user interface sends a notification to the voicemail server to delete the message. In addition, the user may select the order of playback, the order of display or other preferences for displaying recorded messages folders in which the messages are kept or other formats and playback preferences.

In addition to those features explicitly described, the graphical user interface displayed through the set-top box may allow a user to specify a new message indicator that is displayed through the television anytime a customer has unplayed messages in their inbox. The new message indicator may be an audio signal, semi-translucent icon or picture, or other message indicator as specified by the customer.

The graphical user interface may also allow a customer to set password protection for the main voicemail account and another for other sub-accounts. The graphical user interface may also prompt the customer to select an avatar for new messages. The one or more avatars may be linked with the communications information of each caller. In addition, the user selects an avatar that is linked with the customer for any calls that are made by the customer. For example, the user may customize an avatar to be displayed in the event the customer's grandmother should call. In addition, the customer may select how the messages are played, retrieved or delayed for later playback. For example, the new message indicator may be displayed only during the time the television or set-top box is powered up. In another embodiment, the new message indicator may be flashed on the television screen at a specified interval.

Figure 6:
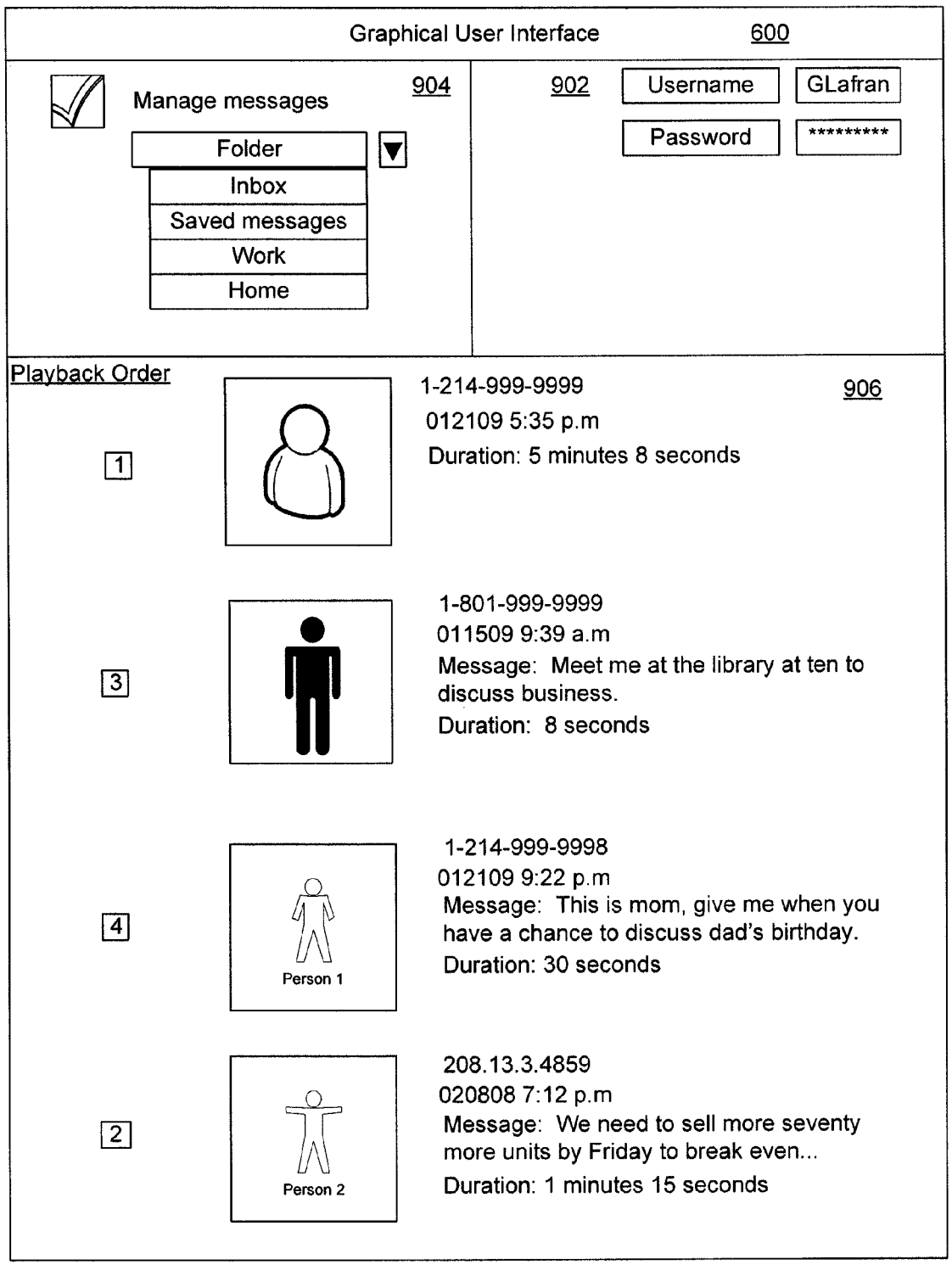
FIG. 6 is a pictorial representation of a graphical user interface in accordance with an illustrative embodiment.

FIG. 6 is a pictorial representation of a graphical user interface 600 in accordance with an illustrative embodiment. The graphical user interface 600 may be generated and displayed by the set-top for managing a voicemail feature of the set-top box. The graphical user interface 600 may also be utilized to manage an externally linked voicemail system, server, or portal. The graphical user interface 600 may include sections 902, 904, and 906.

As shown, the user may be required to enter a username and password in section 902 in order to access the graphical user interface and may otherwise be allowed to change the user name and password as needed. In section 904, the user may be able to manage messages in any number of folders that are standard or created by the user. For example, the folders may include an inbox, saved messages, work messages, and home messages. The different folders may also represent separate voicemail accounts that may be accessible from the set-top box.

The voicemail system may use the graphical user interface to represent the messages and caller information received as illustrated in section 906. For example, as previously described, an avatar or picture may be linked with any number of callers. In addition, the graphical user interface may show the time and date the call was received, the length of the message and any other relevant information. In one embodiment, the graphical user interface may use a voice to text translation program to translate messages or portions of the message for display on the graphical user interface so that the user may determine whether the message is important or not.

The user may also specify a playback order in the event there are a large number of messages or the user wants to listen to the messages in a specified order.

The graphical user interface 900 may also include controls for controlling playback, adding user preferences, updating contact information, and deleting, saving, forwarding, and transferring messages.

The previous detailed description is of a small number of embodiments for implementing the invention and is not intended to be limiting in scope. The following claims set forth a number of the embodiments of the invention disclosed with greater particularity.

The invention claimed is:

1. A method for managing voicemail locally through a set-top box, the method comprising:
receiving a call from a caller;
intercepting the call utilizing a set-top box in response to user preferences of the set-top box;
storing a message from the caller in the set-top box;
displaying an indicator to a television in communication with the set-top box, the indicator being indicative of the message being recorded from the caller by the set-top box;
visually presenting messages recorded from callers by the set-top box to a user in response to the user selecting a channel of the set-top box, the channel being associated with voicemail; and
managing the messages recorded from the callers by the set-top box visually in response to user input received through a remote control in communication with the set-top box, wherein the set-top box manages a plurality of voicemail accounts across a plurality of platforms and communications service providers associated with the user utilizing access information provided by the user.

2. The method of claim 1, further comprising:
displaying a message to a television in communication with the set-top box indicating the voicemail message has been recorded.

3. The method of claim 2, wherein the indicator is a translucent icon displayed over media content being displayed by the television.

4. The method of claim 3, wherein the user selects the indicator to change the set-top box to the channel associated with the voice mail.

5. The method of claim 1, wherein the user manages the one or more messages remotely utilizing an interactive voice response system available from the set-top box through a voice communications connection.

6. The method of claim 1 wherein the one or more messages are stored and accessed from a partition of a memory of the set-top box.

7. The method of claim 1, wherein the user controls playback of the message utilizing the interface, wherein playback includes stop, fast-forward, rewind, pause, play, and playback speed, and wherein the set-top box retrieves contact information from the platforms and communications service providers.

8. The method of claim 1, further comprising:
retrieving contact information associated with the caller to display with the message.

9. The method of claim 1, wherein the intercepting further comprises:
intercepting the message in response to user input to take a message.

10. A set-top box for taking messages comprising:
a telephonic answering module operable to monitor a voice communications line, the telephonic answering module intercepts calls from callers according to user preferences, the telephonic answering module records messages in response to intercepting one of the calls and receiving a message;

a memory in communication with the telephonic answering module, wherein the memory stores the messages; and an interface in communication with the telephonic answering module, wherein the interface displays a user interface on a television for managing the messages stored in the memory of the set-top box, wherein the set-top box manages the messages of a plurality of voicemail accounts across a plurality of platforms and communications service providers associated with the user utilizing access information provided by the user, and wherein the user interface indicates to a user when each of the messages is recorded by the memory of the set-top box.

11. The set-top box of claim 10, wherein the set-top box displays caller information associated with the caller according to the user preferences in response to receiving the call and for each of the plurality of messages.

12. The set-top box of claim 10, further comprising:
a remote control in communication with the interface, the remote control being operable to receive user input to intercept a message and user input to manage the plurality of messages.

13. The set-top box of claim 10, wherein the interface displays a semi translucent indicator on the television in response to recording the message.

14. The set-top box of claim 10, wherein the interface includes an interactive voice response system for receiving voice commands for managing the plurality of messages.

15. The set-top box of claim 10, wherein the interface is accessible to the user in response to a selection of a channel associated with voicemail, wherein the set-top box retrieves contact information from the plurality of platforms and communications service providers.

16. A set-top box comprising:
a processor for executing a set of instructions;
a memory in communication with the processor, the memory operable to execute a set of instructions to:
receive a call from a caller;
intercept the call utilizing a set-top box in response to user preferences of the set-top box;
store a message from the caller in the set-top box;
display an indicator to a television in communication with the set-top box, the indicator indicative of the message being recorded from the caller by the set-top box;
visually present messages recorded from callers by the set-top box to a user in response to the user selecting a channel of the set-top box, the channel being associated with voicemail; and
manage the messages recorded from the callers by the set-top box in response to user input, wherein the set-top box manages the messages of a plurality of voicemail accounts across a plurality of platforms and communications service providers associated with the user utilizing access information provided by the user, and wherein the user input is received through a remote control in communication with the set-top box.

17. The set-top box of claim 16, wherein the set of instructions further:
intercepts the call based on user input by a remote control in communication with the set-top box.

18. The set-top box of claim 16, wherein the set of instructions further:
records the call based on a selection by the user.

19. The set-top box of claim 16, wherein the set of instructions are further executed to:
receive user input associating the channel with the voicemail.

20. The set-top box of claim 16, wherein the set of instructions further:
allow the user to visually control playback of the message and manage one or more messages, wherein the set-top box retrieves contact information from the plurality of platforms and communications service providers.

* * * * *